United States Patent
Schulz et al.

(10) Patent No.: US 8,525,116 B2
(45) Date of Patent: Sep. 3, 2013

(54) MR/PET IMAGING SYSTEMS

(75) Inventors: Volkmar Schulz, Wuerselen (DE); Torsten J. Solf, Aachen (DE); Gordon D. DeMeester, Wickliffe, OH (US); Michael A. Morich, Mentor, OH (US)

(73) Assignee: Koninklijke Philips N.V., Eindhoven (NL)

( * ) Notice: Subject to any disclaimer, the term of this patent is extended or adjusted under 35 U.S.C. 154(b) by 749 days.

(21) Appl. No.: 12/670,256

(22) PCT Filed: Jun. 23, 2008

(86) PCT No.: PCT/IB2008/052483
§ 371 (c)(1),
(2), (4) Date: May 10, 2010

(87) PCT Pub. No.: WO2009/013650
PCT Pub. Date: Jan. 29, 2009

(65) Prior Publication Data
US 2010/0219347 A1 Sep. 2, 2010

Related U.S. Application Data

(60) Provisional application No. 60/951,795, filed on Jul. 25, 2007.

(51) Int. Cl.
*G01T 1/164* (2006.01)
*G01T 1/24* (2006.01)
*A61B 5/05* (2006.01)

(52) U.S. Cl.
USPC ...... 250/363.03; 600/411; 600/407; 324/318; 250/370.09; 250/370.11; 250/363.02; 250/363.04

(58) Field of Classification Search
USPC ............... 324/300–322; 250/363.02–363.04
See application file for complete search history.

(56) References Cited

U.S. PATENT DOCUMENTS

| | | | | |
|---|---|---|---|---|
| 5,404,014 A | * | 4/1995 | Shu et al. | 250/336.1 |
| 6,060,883 A | * | 5/2000 | Knuttel | 324/318 |

(Continued)

FOREIGN PATENT DOCUMENTS

| | | |
|---|---|---|
| DE | 102005015070 A1 | 10/2006 |
| WO | 2006071922 A2 | 7/2006 |

(Continued)

OTHER PUBLICATIONS

DeGrado, T. R., et al.; Performance Characteristics of a Whole-Body PET Scanner; 1994; The Journal of Nuclear Medicine; 35:1398-1406.

(Continued)

*Primary Examiner* — David Porta
*Assistant Examiner* — Jeremy S Valentiner

(57) ABSTRACT

An imaging system includes positron emission tomography (PET) detectors (30) shrouded by broadband galvanic isolation (99) and coincidence detection electronics (50, 50$_{ob}$), or other radiation detectors. A magnetic resonance scanner includes a main magnet (12, 14) and magnetic field gradient assembly (20, 20', 22, 24) configured to acquire imaging data from a magnetic resonance examination region at least partially overlapping the examination region surrounded by the PET detectors. A radio frequency coil (80, 100) has plurality of conductors (66, 166) and a radio frequency screen (88, 188, 188$_{EB}$, 188$_F$) substantially surrounding the conductors to shield the coil at the magnetic resonance frequency. The radiation detectors are outside of the radio frequency screen. Magnetic resonance-compatible radiation collimators or shielding (60, 62) containing an electrically non-conductive and non-ferromagnetic heavy atom oxide material are disposed with the radiation detectors.

25 Claims, 8 Drawing Sheets

(56) References Cited

U.S. PATENT DOCUMENTS

Figure 1:
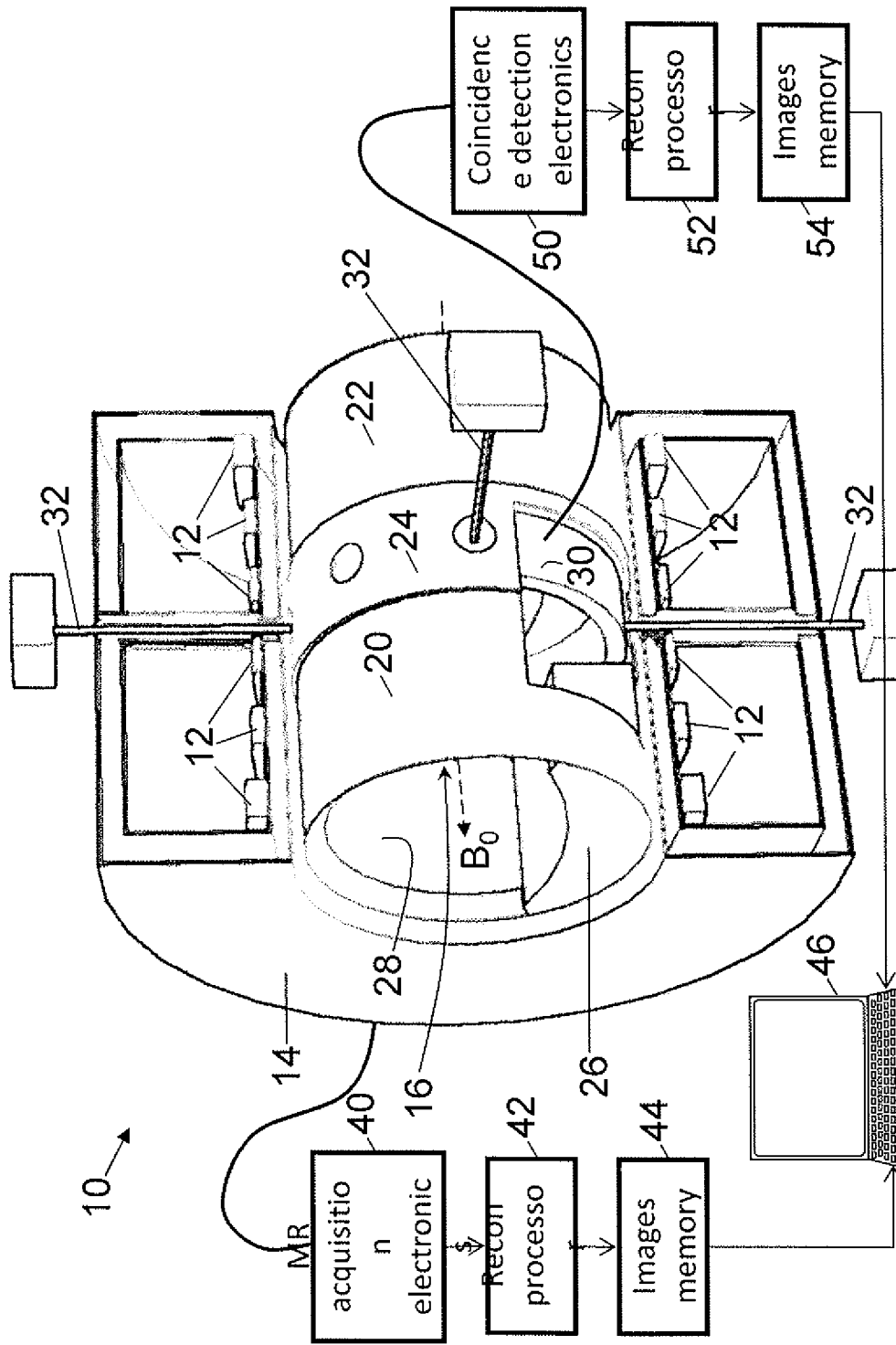

| | | | |
|---|---|---|---|
| 6,822,453 B2* | 11/2004 | Boemmel et al. | 324/320 |
| 6,862,468 B2* | 3/2005 | Smith | 600/410 |
| 6,946,841 B2 | 9/2005 | Rubashov | |
| 7,235,974 B2* | 6/2007 | Nistler et al. | 324/318 |
| 7,501,822 B2* | 3/2009 | Sacher et al. | 324/318 |
| 7,522,952 B2 | 4/2009 | Krieg et al. | |
| 7,667,457 B2* | 2/2010 | Linz et al. | 324/307 |
| 7,728,590 B2* | 6/2010 | Eberler et al. | 324/318 |
| 8,131,340 B2* | 3/2012 | Eberlein et al. | 600/411 |
| 2001/0035504 A1* | 11/2001 | Hayes | 250/515.1 |
| 2002/0033046 A1* | 3/2002 | Beitia et al. | 73/504.12 |
| 2002/0148970 A1* | 10/2002 | Wong et al. | 250/394 |
| 2006/0293580 A1 | 12/2006 | Ladebeck et al. | |
| 2007/0055127 A1 | 3/2007 | Ladebeck et al. | |
| 2007/0102641 A1 | 5/2007 | Schmand et al. | |

FOREIGN PATENT DOCUMENTS

| | | |
|---|---|---|
| WO | 2006/111883 A2 | 10/2006 |
| WO | 2006111869 A2 | 10/2006 |
| WO | 2006119085 A2 | 11/2006 |

OTHER PUBLICATIONS

Strul, D., et al.; Gamma Shielding Materials for MR-Compatible PET; 2003; IEEE Trans. on Nuclear Science; 50(1) 60-69.

Yamamoto, S., et al.; Development of a Flexible End-Shield Using Tungsten Curtains for 3D PET; 2006; IEEE Trans. on Nuclear Science; 53(5)2671-2674.

Pereen, "Stream Function Approach for Determining Optimal Surface Currents", *Journal of Computational Physics*, 2003, vol. 191, pp. 305-321.

Pereen, "Stream Function Approach for Determining Optimal Surface Currents" Doctoral Thesis of Gerardus N. Pereen, Eindhoven University of Technology, 2003.

* cited by examiner

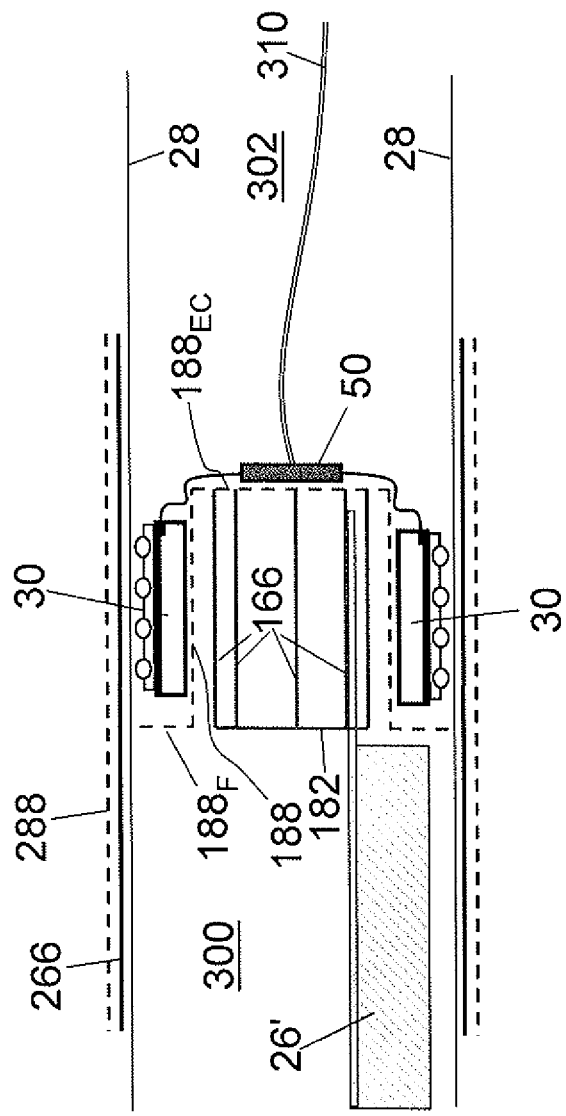

MR/PET IMAGING SYSTEMS

CROSS REFERENCE TO RELATED APPLICATIONS

This application claims the benefit of U.S. provisional application Ser. No. 60/951,795 filed Jul. 25, 2007, which is incorporated herein by reference.

The following relates to the imaging arts. The following finds illustrative application to hybrid magnetic resonance scanning and positron emission tomography (PET) systems, and is described with particular reference thereto. However, the following will find more general application in hybrid imaging systems of various types, such as hybrid PET/magnetic resonance imaging systems, hybrid SPECT/magnetic resonance imaging systems, and so forth.

There is substantial interest in development of hybrid scanners providing both magnetic resonance and PET imaging capabilities. However, both magnetic resonance scanner and PET scanners are highly sensitive instruments. Operation of the PET scanner is degraded by magnetic and radio frequency fields generated by the magnetic resonance scanner, and by gamma ray absorption in dense components of the magnetic resonance scanner. At the same time, lead shielding typically used in PET detectors interferes with magnetic resonance imaging due to its high electrical conductivity. However, omitting such shielding substantially degrades the PET imaging performance. Lead shielding is also heavy and difficult to mechanically shape, which makes it difficult to incorporate PET detectors with lead shielding into the restricted space available in a typical magnetic resonance scanner bore.

The following provides new and improved apparatuses and methods which overcome the above-referenced problems and others.

In accordance with one aspect, an imaging system is disclosed, comprising: positron emission tomography (PET) detectors substantially encircling an examination region; electronics operatively coupled with the PET detectors to perform coincidence detection of probative radiation comprising 511 keV gamma rays generated by electron positron annihilation events occurring in the examination region; and radiation shielding disposed adjacent the PET detectors to reduce interaction of non-probative radiation with the PET detectors, at least a portion of the radiation shielding comprising an electrically non conductive and non ferromagnetic heavy atom oxide material.

In accordance with another aspect, an imaging system is disclosed, comprising: positron emission tomography (PET) detectors substantially encircling an examination region; electronics operatively coupled with the PET detectors to perform coincidence detection of probative radiation comprising 511 keV gamma rays generated by electron positron annihilation events occurring in the examination region; a magnetic resonance scanner comprising a main magnet and a magnetic field gradient assembly, the magnetic resonance scanner configured to acquire imaging data from a magnetic resonance examination region at least partially overlapping the examination region surrounded by the PET detectors; and a radio frequency coil comprising a plurality of conductors and a radio frequency screen encircling the plurality of conductors, the PET detectors being disposed outside of the radio frequency screen, the radio frequency screen providing radio frequency shielding for the PET detectors at the magnetic resonance frequency.

In accordance with another aspect, an imaging system is disclosed, comprising: a magnetic resonance scanner comprising a main magnet, a magnetic field gradient assembly, and a whole body radio frequency screen; a local radio frequency coil having a radio frequency screen including an end cap portion and a flanged open portion, the flanged portion sized such that an annular edge of the flange portion is proximate to the whole body radio frequency screen to define a radio frequency space including an interior of the local radio frequency coil and a radio frequency free space including most of an exterior of the local radio frequency coil; and an annular ring of positron emission tomography (PET) detectors mounted on the local radio frequency coil in the radio frequency free space to view the interior of the local radio frequency coil.

In accordance with another aspect, an imaging system is disclosed, comprising: a bore-type magnetic resonance scanner comprising a main magnet, a magnetic field gradient assembly, and a generally cylindrical radio frequency screen arranged coaxially with the scanner bore, the generally cylindrical radio frequency screen having a radius $R_2$ except at a central annular groove or channel of smaller radius $R_1$ compared with the radius $R_2$; one or more radiation detectors received into the annular groove or channel of the generally cylindrical radio frequency screen and operatively coupled with electronics to perform radiation detection, the one or more radiation detectors including a radiation collimator or radiation shielding comprising an electrically non-conductive and non-ferromagnetic heavy atom oxide material.

In accordance with another aspect, a radio frequency screen for use with an imaging system is disclosed, comprising a generally cylindrical radio frequency screen having a radius $R_2$ respective to a central axis, the generally cylindrical radio frequency screen having a central annular groove or channel at which the generally cylindrical radio frequency screen has a smaller radius $R_1$ compared with the radius $R_2$.

One advantage resides in providing PET detectors with effective shielding that is compatible with a magnetic resonance system.

Another advantage resides in providing PET detectors that are readily shaped to conform with the restricted space available in a typical magnetic resonance scanner bore.

Another advantage resides in providing a magnetic resonance scanner with well-defined regions from which the radio frequency signals are excluded, such regions being available for receiving PET detectors or other rf-sensitive components.

Another advantage resides in providing a compact radio frequency coil/PET detectors array module for selective use with a magnetic resonance scanner.

Another advantage resides in providing a combined PET/magnetic resonance brain coil insert suitable for performing simultaneous PET and magnetic resonance brain imaging.

Still further advantages of the present invention will be appreciated to those of ordinary skill in the art upon reading and understand the following detailed description.

The drawings are only for purposes of illustrating the preferred embodiments, and are not to be construed as limiting the invention.

FIG. 1 diagrammatically shows a perspective view of a hybrid imaging system with both PET and magnetic resonance imaging capability, with partial cutaway to reveal selected internal components.

Figure 2:
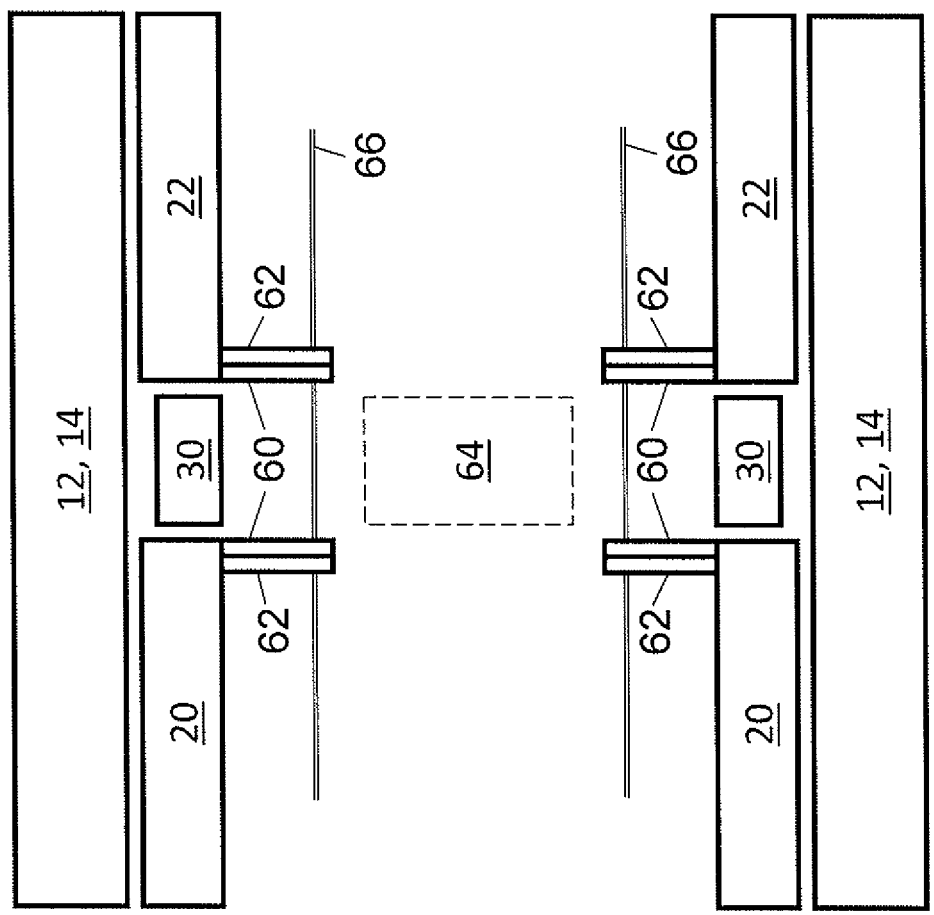

FIG. 2 diagrammatically shows a longitudinal sectional view of the imaging system of FIG. 1 that shows features including radiation shielding for the PET detectors and conductors of a whole-body radio frequency coil.

Figure 3:
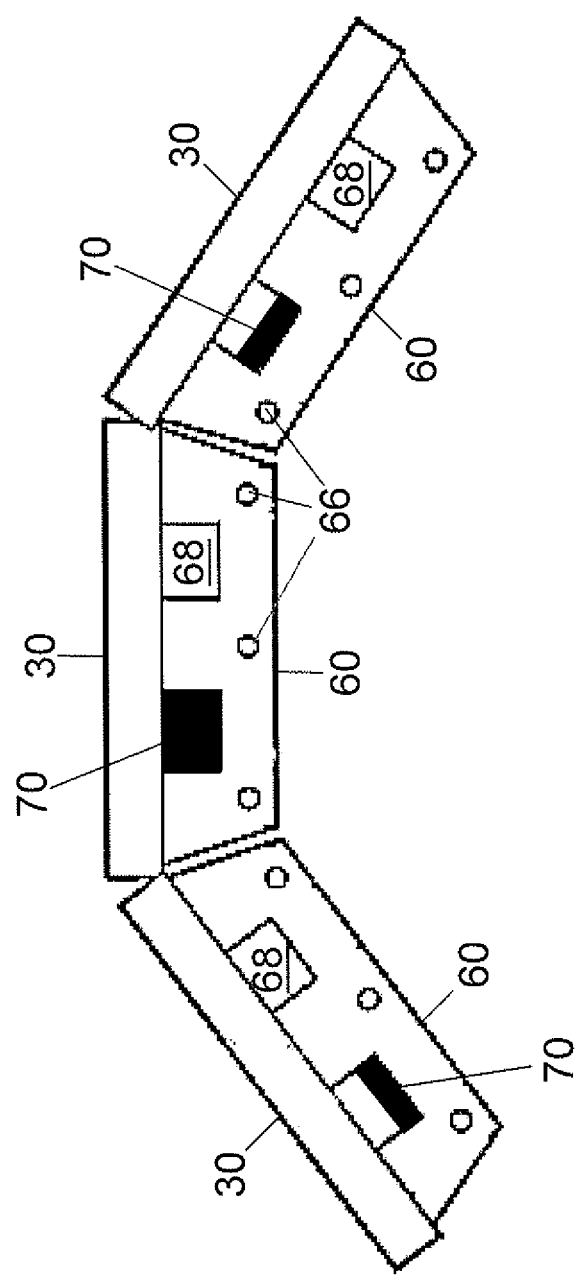

FIG. 3 diagrammatically shows an axial view of the PET detectors and radiation shielding, along with shim pockets and some shims.

Figure 4:
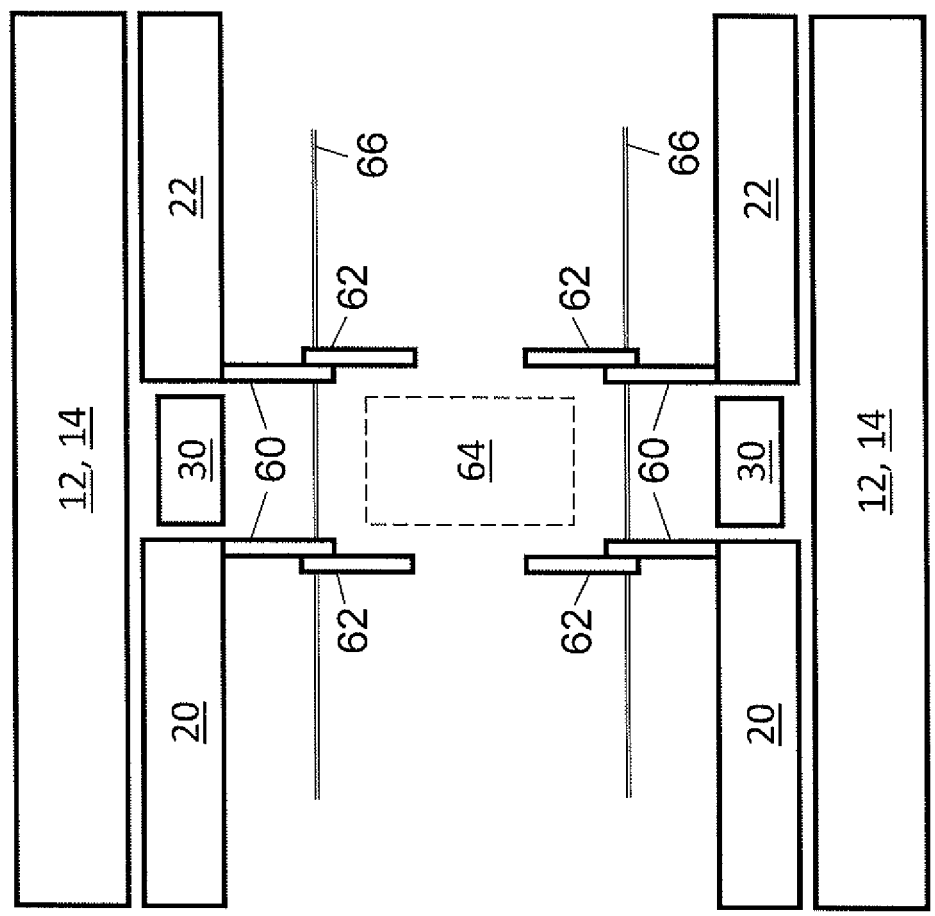

FIG. 4 diagrammatically shows the same longitudinal sectional view of the imaging system as shown in FIG. 2, but with the radiation shielding for PET detectors extended toward the examination region.

Figure 5:
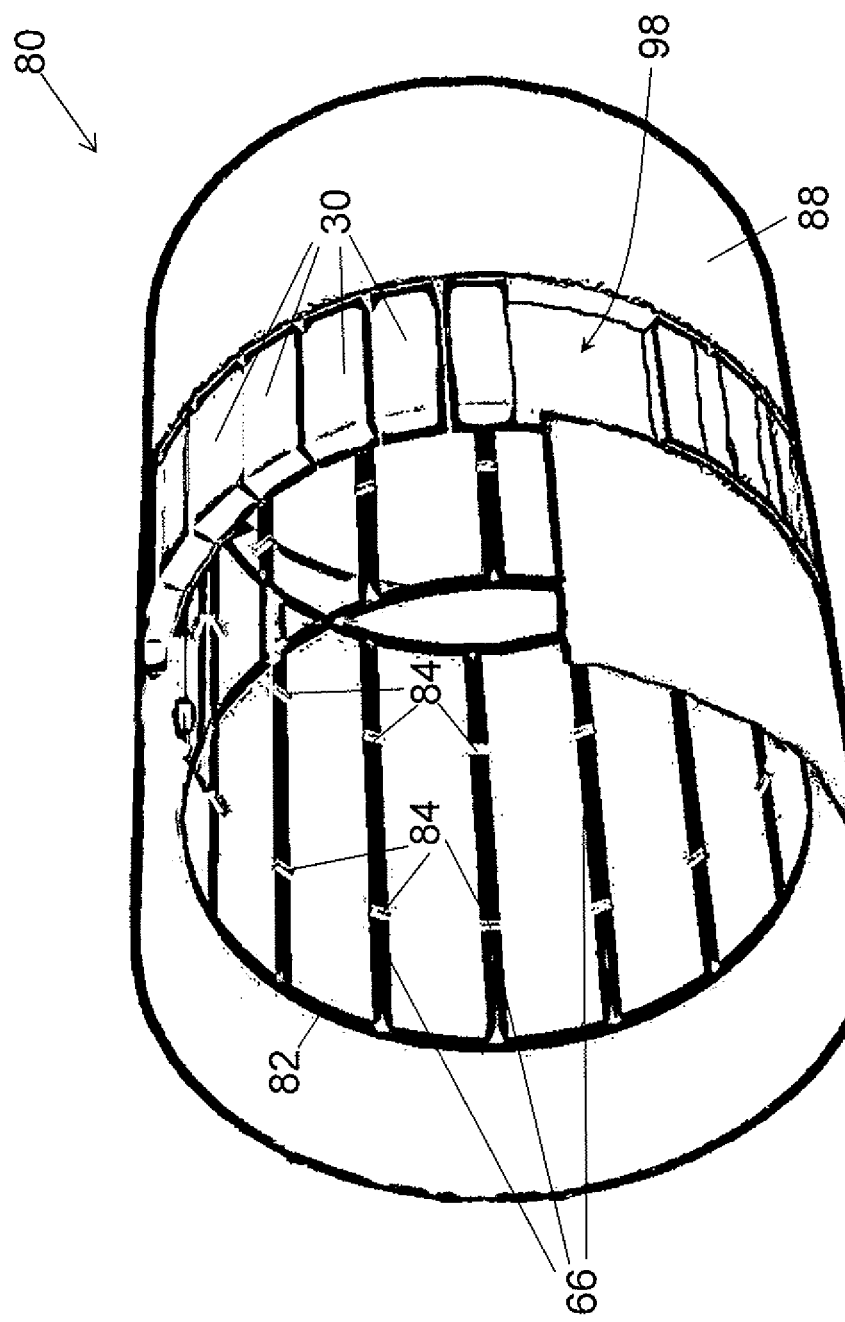

FIG. 5 diagrammatically shows a perspective view of the whole-body radio frequency coil of the hybrid system of FIG. 1 with an annular ring of PET detectors received into a slot of the radio frequency screen. FIG. 5 is shown in partial cutaway to reveal selected internal components.

Figure 6:
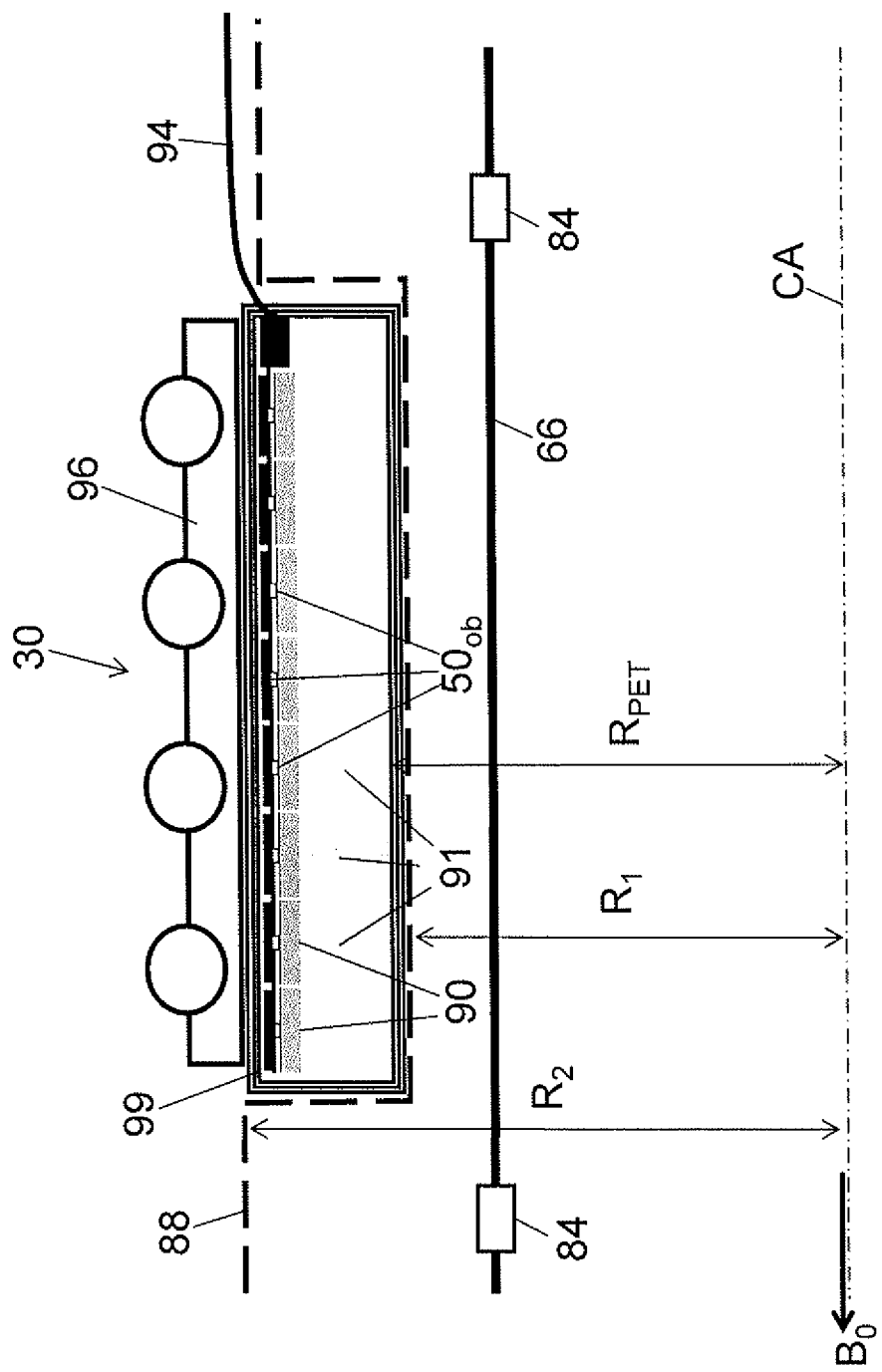

FIG. 6 diagrammatically shows a partial longitudinal sectional view of one of the PET detector modules of FIG. 5 disposed in the slot of the radio frequency screen.

Figure 7:
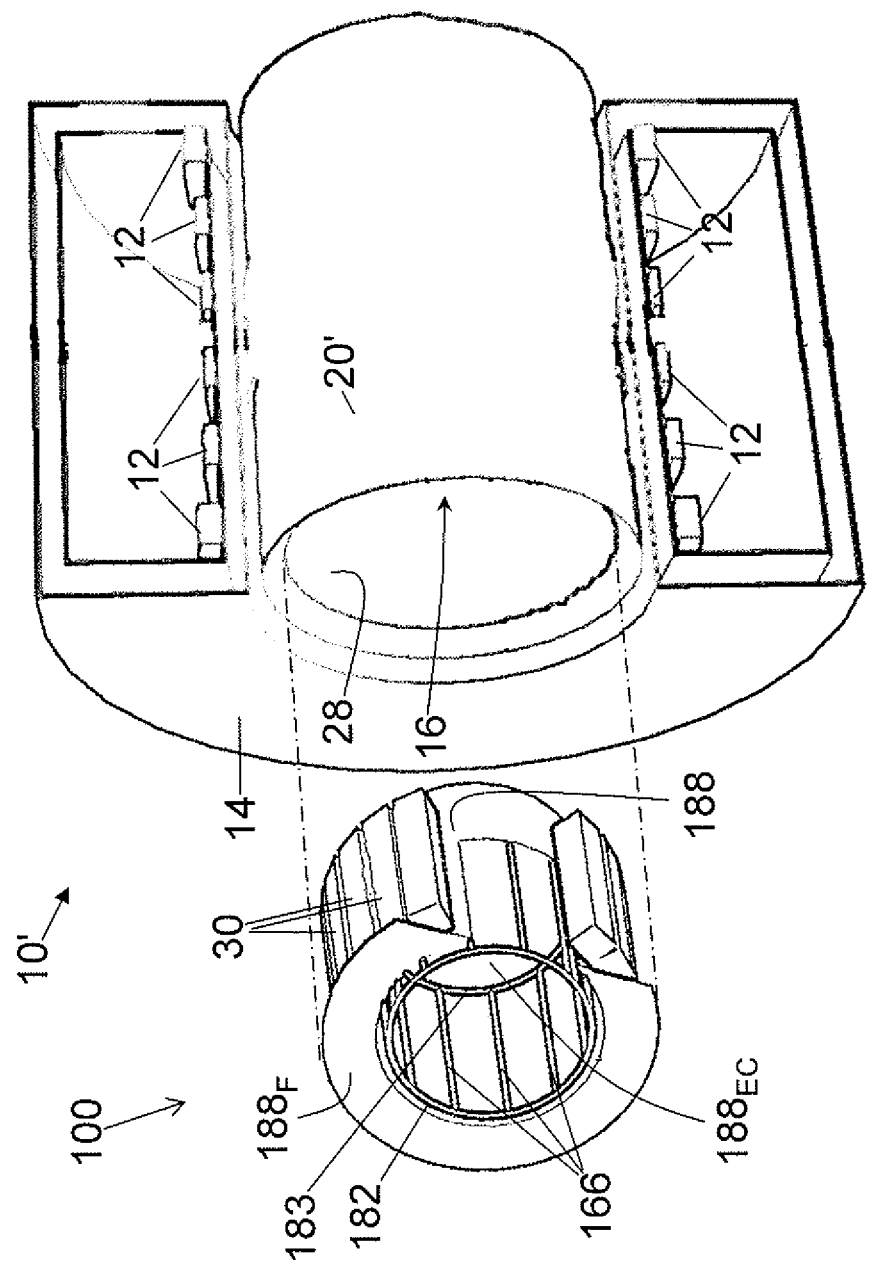

FIGS. 7 and 8 show diagrammatic perspective and sectional views, respectively, of another hybrid system that includes a local head coil with integrally mounted annular ring of PET detectors.

With reference to FIG. 1, an imaging system 10 includes a magnetic resonance scanner with main magnet windings 12 disposed in a cryogenic housing 14 defining a main magnet producing the static axially oriented $B_0$ magnetic field in magnetic resonance examination region 16. Magnetic field gradient coils 20, 22 (diagrammatically shown as supportive formers without depicting the magnetic field gradient-generating conductors) are constructed in two parts with an annular gap therebetween that is bridged by a mechanical brace 24 to accommodate Lorentz forces between the gradient coil portions 20, 22. The illustrated magnetic resonance scanner is a bore-type scanner and includes a subject support 26 disposed in the bore to support a subject, such as a human medical patient, at or near a central axis of the bore. In some embodiments, a generally cylindrical bore liner 28 may cover the inside surface of the bore. The central annular gap is, in the embodiment of FIG. 1, free of gradient coil windings, except possibly for current feed conductors (not shown) that optionally cross the central gap to electrically connect the two sub-sets 20, 22 of magnetic field gradient coil windings in series. Each portion 20, 22 includes primary gradient coil windings supported on an inner cylindrical surface of the formers 20, 22, and shield gradient coil windings supported on an outer cylindrical surface of the formers 20, 22, and optionally also connecting conductors disposed at each edge of the central annular gap that electrically connect selected primary and secondary coil windings.

Connecting windings allow for non-zero current densities for the gradient coil portions 20, 22 at the edges of the central annular gap. The configuration of windings of the magnetic field gradient coil portions 20, 22 is designed to provide good magnetic field gradient uniformity at least in the magnetic resonance examination region 16. Such design is suitably performed using a stream function approach, as described for example in Peeren, "Stream Function Approach for Determining Optimal Surface Currents", Journal of Computational Physics vol. 191 pages 305-21 (2003) and in "Stream Function Approach for Determining Optimal Surface Currents", Doctoral Thesis of Gerardus N. Peeren (Eindhoven University of Technology 2003), both of which are incorporated herein by reference in their entirety. The stream function approach determines a continous current density distribution, represented by a stream function, that provides a specified magnetic field distribution, and then discretizes the obtained stream function to obtain the coil windings distribution. In some embodiments, the gradient coil windings 20, 22 are configured with the "fingerprints" of the primary and shield coil windings rotated by about 45° away from the vertical. Some other magnetic field gradient coils with an annular gap are described further in U.S. Provisional Application Ser. No. 60/910,032 filed Apr. 4, 2007, which is incorporated herein by reference in its entirety.

An annular ring of positron emission tomography (PET) detectors 30 are disposed in an annular central gap of the magnetic field gradient coil 20, 22. The PET detectors 30 are supported mechanically in a separate manner from the support of the magnetic field gradient assembly 20, 22, 24. In the illustrated embodiment, mounting members 32 pass through the openings in the brace 24 and openings in the cryogenic magnet housing 14 to support the annular ring of PET detectors 30 independently from the magnetic field gradient assembly 20, 22, 24. Such independent support is advantageous because the gradient coil assembly 20, 22, 24 generally distorts and vibrates during operation due to Lorentz forces. The outer support (not shown) to which the mounting members 32 connect can be a sub-frame completely surrounding the magnetic resonance scanner, a set of hard points on the walls of the room containing the scanner, a vibration isolation mount to the surface of the magnet's inner or outer structure, or so forth.

With continuing reference to FIG. 1, the magnetic resonance scanner further includes acquisition electronics 40 that operate the magnetic field gradient coil 20, 22 and one or more radio frequency coils (not shown in FIG. 1) to generate and collect k-space samples that are processed by a reconstruction processor 42, such as a fast Fourier transform (FFT) reconstruction processer to generate magnetic resonance images that are stored in an images memory 44, displayed on a user interface 46, or otherwise utilized.

The PET detectors 30 are controlled by coincidence detection electronics 50 to identify and accumulate substantially coincident 511 keV gamma ray detection events indicative of positron-electron annihilation events in an examination region surrounded by the annular ring of PET detectors 30. Although the coincidence detection electronics 50 are illustrated as a discrete unit in FIG. 1, it is contemplated for a portion of these electronics to be integrated with the PET detectors 30. For example, the PET detectors 30 may be silicon photomultiplier (SiPM) detectors formed on silicon substrates that also support analog-to-digital conversion electronics and time-stamping electronics such that the data off-loaded from the PET detectors 30 comprises digitally timestamped digital samples corresponding to radiation detection events, for example in a list format.

The remote portion of the coincidence detection electronics in such an embodiment include digital data processing electronics that search the list of digital samples for radiation detection events that are coincident within a selected time window and have energies corresponding to 511 keV gamma rays within a selected energy window. The substantially coincident 511 keV detection events define endpoints of a line of response, somewhere along which occurred the sourcing positron-electron annihilation event.

In some embodiments, the coincidence detection electronics 50 acquire time-of-flight (TOF) PET data, in which a time difference (or lack thereof) between the two substantially coincident 511 keV gamma ray detection events are used to at least approximately localize the sourcing positron-electron annihilation event along the line of response. For example, if the time difference is zero, then the sourcing positron-electron annihilation event is localized to about the midpoint of the line of response. On the other hand, if the time difference is relatively large (e.g., of order 500 ps), then the sourcing positron-electron annihilation event is localized to be closer to the detector of the earlier of the two substantially coincident 511 keV gamma ray detection events. For either PET or TOF-PET data, a reconstruction processor 52 performs an image reconstruction process, such as an iterative back-projection reconstruction, to generate PET images that are stored in an images memory 54, displayed on a user interface 46, or otherwise utilized.

With reference to FIGS. 2 and 3, in some embodiments the PET sub-system of the imaging system of FIG. 1 is provided with radiation shielding 60, 62 that limits the field of view of the PET detectors 30 to approximately an examination region 64 of the PET imaging. The radiation shielding 60, 62 is advantageously made of an electrically non-conductive, non-ferromagnetic, and substantially non-radioactive heavy atom oxide material, such as lead oxide (PbO). Lead oxide has excellent stopping characteristics for gamma rays due to the high atomic weight of the lead (Pb) atom. Lead oxide has a high density (>9.5 g/cm$^3$), and is also electrically non-conductive and non-ferromagnetic. Advantageously, the magnetic resonance imaging is not strongly influenced by lead oxide due to the low magnetic susceptibility of lead oxide (<43×10$^{-6}$ cm$^3$/mol) and its low electrical conductivity. In some embodiments, the radiation shielding 60, 62 further includes a resin, glass, or plastic host material in which is dispersed lead oxide in the form of a powder. In some embodiments, the radiation shielding 60, 62 includes a ceramic material including lead oxide, for example produced by hot curing of lead oxide powder or firing into a glass or crystalline form.

The ability to shape the resin, glass, or plastic material containing lead oxide has certain advantages, as best seen in FIG. 3 which shows a portion of the PET detectors 30 constructed as modules viewed along the axial (e.g., $B_0$) direction. The radiation shielding units 60, 62 are shaped to define conduits suitable for receiving rods 66 a of a radio frequency coil. The radiation shielding units 60, 62 are further shaped to define shim pockets 68, into some of which are inserted ferromagnetic shims 70 so as to shim the magnetic field. The shims 70 can correct for residual susceptibility artifacts caused by the radiation shielding units 60, 62, or for other magnetic field inhomogeneity sources, or both. The shims 70 can be passive ferromagnetic shims, active shimming coils, or a combination thereof. The resin, glass, or plastic material containing lead oxide is electrically insulating, and hence can serve as the dielectric former for supporting the radio frequency coil rods 66 and/or an associated radio frequency shield. Thus, the radiation shielding 60, 62 is integrally formed with the radio frequency coil in these embodiments.

As seen in FIG. 2, the radiation shielding 60, 62 forms annular rings on opposite sides of the annular ring of PET detectors 30; accordingly, the radiation shielding 60, 62 and shims 70 are not in the line-of-sight between the PET detectors 30 and the examination region 64, and hence do not block the probative radiation (e.g., the 511 keV gamma rays emanating from the examination region 64). However, the radiation shielding 60, 62 does block non-probative radiation emanating or scattered from outside of the examination region 64. Portions of the conductive rods 66 of the radio frequency coil within the line-of-sight between the PET detectors 30 and the examination region 64 should have thickness along the line-of-sight effective to be substantially transparent to the probative radiation. For example, portions of the conductive rods 66 can be generally planar copper strips of thickness less than or about 5-6 δ where δ is the skin depth. For $B_0$=3T, the magnetic resonance frequency for $^1$H proton resonance is about 128 MHz and the skin depth δ is approximately 6 microns, and so the strip line is preferably less than 50 microns thick, and more preferably about 30-40 microns thick. To reduce coil resistance, the strip lines are optionally made relatively wide, for example of order 1-5 centimeters or wider, although strip lines of narrower width are also contemplated.

With reference to FIG. 4, in some embodiments the radiation shielding 62 is selectively extendible toward or away from the examination region 64. Extension of the radiation shielding units 62 toward the examination region 64 is suitably accomplished by actuators made of non-ferromagnetic materials. To accommodate the optional intersecting radio frequency coil conductors 66, the radiation shielding units 62 can include narrow slots running along the direction of extension. Although not shown in FIGS. 2-4, in some embodiments it is also contemplated for the radiation shielding to extend to the radial region coincident with the PET detectors 30, or even to extend radially beyond the PET detectors 30 up to the cryogenic housing 14 to provide additional shielding. Optionally, radiation shielding units below the subject support can be permanently extended to the extent permitted by the subject support and its associated guides, drive or the like. It is also contemplated that selected surfaces of the gradient coil assembly may be coated with a lead oxide-based radiation shielding material, such as the innermost diameter or surface, so as to provide further integrated radiation shielding.

With reference to FIG. 5, a suitable whole-body radio frequency coil 80 configured for integration with the PET detectors 30 is illustrated. The radio frequency coil 80 includes the aforementioned conductive rods 66, which in the embodiment of FIG. 5 are connected at one or both ends by an end-ring 82 (only a portion of one end-ring 82 and a portion of the rods 66 is visible in the cutaway region of FIG. 5). In the illustrative radio frequency coil 80, lumped tuning capacitors 84 are included in the conductors. To avoid blocking probative radiation, these lumped capacitors 84 are disposed outside of the line-of-sight between the PET detectors 30 and the examination region. In the embodiment of FIG. 5, the lumped capacitors 84 are disposed axially offset from the annular ring of PET detectors 30. The conductors 66 are advantageously manufactured using strip line technology at least where the conductors 66 pass through the line-of-sight between the PET detectors 30 and the examination region 64. The strip-lines should have a thickness of less than or about 50 microns, and more preferably have a thickness around 5-6 δ, i.e. 30-40 microns for $B_0$=3T (128 MHz for the $^1$H magnetic resonance), in order to keep the SNR high.

With continuing reference to FIG. 5 and with further reference to FIG. 6, the radio frequency coil 80 further includes a generally cylindrical radio frequency screen 88 surrounding the rods 66 and the optional end-ring(s) 82 to improve SNR on receive and, if the radio frequency coil 80 is used as a transmitter, to limit RF losses and coupling losses to the gradient coil. In some embodiments, one or both end-rings are omitted, and the rods are electrically coupled to the radio frequency screen 88 to provide a current return path. The PET detector modules 30 are disposed behind the radio frequency screen 88, that is, in the region where radio frequency emissions from the radio frequency coil 80 are blocked by the radio frequency screen 88. Similarly to the conductors 66, the radio frequency screen 88, at least in the line-of-sight of the PET detectors 30, should be made of a thin metal, mesh-like metal screen, or other structure (e.g., thickness around 5-6 δ, i.e. 30-40 microns for $B_0$=3T) to ensure that the radio frequency screen 88 does not absorb an inordinate portion of probative 511 keV gamma particles. The RF screen or ground plane may be made as a thin copper slotted structure with capacitive bridges or overlap such that it appears as a continuous sheet at high frequencies and does not support gradient-like eddy currents below about 5 kHz. Where lumped element capacitive bridges are used these are preferably located outside the line-of-sight of the PET detectors. A similar isolation shield optionally protects the PET from magnetic resonance transmit and protects the magnetic resonance scanner from the PET electronic activity. Alternatively, the RF screen could be made of a conductive mesh, preferably a mesh with a combination of lines-density, wire diameter and electrical conductivity to pass pulsed gradient fields below about 5 kHz and substantially screen electromagnetic fields at about a magnetic resonance frequency.

Radiation-sensitive elements of the PET detectors 30 in some embodiments include avalanche photodiodes or silicon photomultiplier (SiPM) elements 90 viewing scintillators 91. A 511 keV gamma ray impinging on the scintillators 91 generates a "scintillation", i.e., a flash of light that is detected by the closest SiPM elements 90. In some embodiments, Anger logic or other processing is used to provide localization and estimation of the particle energy based on the intensity and distribution of the scintillation. Some suitable SiPM devices are described in Frach et al., WO 2006/111883 A2 and in Fiedler et al., WO 2006/111869 A2, both of which are incorporated herein by reference in their entireties. SiPM or APD detectors have certain advantages including compactness and relative insensitivity to magnetic fields. However, it is also contemplated to employ conventional photomultiplier tube detectors, for example arranged remote from the magnet and operatively coupled with the scintillators 91 by optical fibers, or to employ a photoconductive or other solid state element that directly generates an electrical current or other electrical signal responsive to impingement of a 511 keV gamma ray without the use of the scintillators 91.

The SiPM elements 90 are, in the embodiment of FIG. 6, electrically connected with on-board portions of the coincidence detection electronics $50_{ob}$ including time domain conversion (TDC)/analog-to-digital conversion (ADC) electronics that convert radiation detection events into digital data including digitized intensity information corresponding to the detected particle energy and a digital timestamp indicating the detection time. In some embodiments, SiPM detectors 90 and TDC/ADC electronics $50_{ob}$ are monolithically integrated on common silicon substrates. Additionally, electrical power and communication cabling 94 operatively connected with the PET detectors 30 are disposed outside of the radio frequency screen 88, and fluid cooling lines 96 operatively connected with the PET detectors 30 to keep the PET detectors at a suitable operating temperature are also disposed outside of the cylindrical radio frequency screen 88.

In the embodiment shown in FIGS. 5 and 6, the radio frequency screen 88 includes an annular channel or groove 98 that receives the annular ring of PET detectors 30. (In FIG. 5, two PET detector modules are removed to more clearly reveal the channel 98). In the embodiment shown in FIGS. 5 and 6, the annular channel 98 in the radio frequency screen 88 is defined by a region at axial positions overlapping the annular ring of PET detectors 30 having a first radius $R_1$ respective to a central axis CA of the magnetic resonance scanner bore, the first radius $R_1$ being smaller than an innermost radius $R_{PET}$ of the annular ring of PET detectors 30. The radio frequency screen 88 has a second radius $R_2$ larger than the first radius $R_1$ at axial positions not overlapping the annular ring of PET detectors 30. The annular channel 98 in the radio frequency screen decreases the RF coil sensitivity locally, but the overall or integrated coil sensitivity is typically higher near the center of a cylindrical coil, and so the effect of the annular channel 98 is to modify the coil sensitivity and sensitivity uniformity. The channel 98 enables the PET detectors 30 to be positioned at the closer innermost radius $R_{PET}$ to provide enhanced signal and hence enhanced SNR for the PET imaging. It is contemplated that the radio frequency screen 88 may be extended in length at the radius $R_1$ to substantially cover the gradient coil assembly inner diameter surface. The annular groove or channel 98 is optional; in other embodiments, the radii $R_1$, $R_2$ may be of the same value (that is, the groove 98 is omitted) and substantially equal to the gradient coil assembly inner radius. In some embodiments, the heavy atom oxide-based radiation shielding may extend along at least a portion of the inner diameter surface of the gradient coil 20, 22.

The radio frequency screen 88 is configured to be an RF ground plane at the magnetic resonance frequency that the radio frequency coil 80 operates, but to be substantially transparent for pulsed gradient magnetic fields, such as fields below 5 kHz. This can be done by incorporating lumped or distributed reactive elements such as capacitors into the radio frequency screen 88, by making the screen 88 as an alternately slotted double-layer printed circuit board structure in which the spacing of the double layers is selected for a capacitive effect, or so forth. Because of the low pass nature of the radio frequency screen 88, it is highly blocking for energy at the magnetic resonance frequency, but is substantially transmissive for lower frequencies such as typical frequencies at which magnetic field gradients are switched or modulated.

The placement of the PET detectors 30 and associated cabling and cooling lines 94, 96 outside the volume of the generally cylindrical radio frequency screen 88 ensures that radio frequency signals generated by the radio frequency coil 80 during magnetic resonance imaging do not adversely affect PET detector performance. However, the PET detectors 30 can also generate radio frequency interference, that can be problematic for the magnetic resonance imaging. Accordingly, the PET detectors 30 are optionally surrounded by thin galvanic isolation 99 which at high frequencies isolates and at low frequencies appears resistive. For example, the galvanic isolation 99 can be a thin conductive non-resonant screen or shield of copper (e.g., 35 microns thick is suitable). Alternatively the isolation can be configured as a segmented RF screen, or can be configured as a screen made of a mesh conductor that cannot support low frequency eddy currents. The illustrated PET detectors 30 are arranged as modules each having galvanic isolation 99 that is electrically isolated from the galvanic isolation of neighboring modules to break up the surface for induction. The galvanic isolation 99 also suitably serves as a light shield to block extraneous photons from triggering the SiPM elements 90, or a separate light shield can be provided.

With reference to FIGS. 7 and 8, another imaging system 10' is described. The imaging system 10' is similar to the imaging system 10 of FIG. 1, but uses a single-piece magnetic field gradient assembly 20' rather than the two sections 20, 22 separated by the annular gap and braced by the brace 24. Additionally, the annular ring of PET detectors 30 is not disposed in the bore of the magnetic resonance scanner, but rather is integrated with a local head coil 100 that includes conductive rods 166 and a surrounding radio frequency screen 188. In the embodiment of FIG. 7, conductive end-rings 182, 183 interconnect the ends of the conductive rods 166. The radio frequency screen 188 may have an end-capped screen having an end-cap $188_{EC}$ arranged proximate to the end-ring 183. The end-ring 183 is loosely coupled with the radio frequency screen 188 proximate to the end-cap $188_{EC}$ to define a radio frequency mirror that enhances $B_1$ field homogeneity inside of the local head coil 100. In some embodiments, as shown in FIG. 8, the end-ring 183 is omitted and the ends of the conductive rods 166 are capacitively connected to the radio frequency screen 188 at the end-cap $188_{EC}$ to define the radio frequency mirror. The end ring 182 at the open end may be present, or in the case of a TEM-like RF coil structure may be eliminated. The radio frequency mirror provided by the end-cap $188_{EC}$ also serves to contain the radio frequency energy to help isolate the RF elements and the annular ring of PET detectors 30 disposed on the outside of the radio frequency screen 188.

The end of the local head coil 100 opposite the end-cap is open to receive a human head or other imaging subject into the interior of the coil 100. To block radio frequency interference from reaching the PET detectors 30, the radio frequency screen 188 includes an outwardly extending flange $188_F$. As seen in FIG. 8, the bore-type magnetic resonance scanner includes a generally cylindrical radio frequency screen 288 coaxial with and surrounding the bore liner 28, and in close proximity thereto. Optionally, rods 266 and other conductors such as end-rings (not shown) cooperate with the generally cylindrical radio frequency screen 288 to define a whole-body radio frequency coil that is left in the bore but typically not used when the head coil 100 is in use. The outwardly extending flange $188_F$ of the local radio frequency coil 100 is sized to extend annularly outward toward the generally cylindrical whole-body radio frequency screen 288 such that the annular edge of the flange $188_F$ is proximate to the whole-body radio frequency screen 288 to provide shielding at the magnetic resonance frequency. To accommodate this arrangement, the subject support 26 of FIG. 1 is replaced by a modified subject support 26' that is inserted into the bore along with the head coil 100.

Thus, the radio frequency screen 188 of the local coil 100, including the end-cap portion $188_{EC}$ and the outwardly extending flange $188_F$, cooperates with the generally cylindrical radio frequency screen 288 to define two spaces: a radio frequency space 300 including an interior of the local coil 100 in which radio frequency signals generated by the local radio frequency coil 100 may propagate, and a radio-frequency-free space 302 including most of an exterior of the local coil 100 that is shielded from such radio frequency signals due to the cooperating radio frequency screens and screen portions 188, $188_{EC}$, $188_F$, 288. The "radio frequency-free space" 302 identifies a space in which radio frequency energy generated by the local radio frequency coil 100 is substantially reduced or eliminated as compared with the radio frequency space 300 due to the forementioned resonant radio frequency coil. As seen in FIG. 8, the annular ring of PET detectors 30 is disposed in the radio-frequency-free space 302 and hence is not adversely affected by radio frequency signals generated by the local head coil 100.

In the embodiment shown in FIG. 8, the coincidence detection electronics 50 are also advantageously mounted on the local head coil 100 behind the end-cap screen portion $188_{EC}$ in the radio-frequency-free space 302. (Although not shown, there is optionally provided a dielectric former or frame for mechanical support of the radio frequency screen 188 and other components 50, 166, 182, 183). A cable bundle 310 leads away from the electronics 50. Advantageously, the electronics 50 and the cable bundle 310 are both disposed in the radio frequency-free space 302, and so traps, baluns, and other radio frequency signal attenuation devices, generally intended to reduce interaction with the radio frequency coil, are optionally omitted from the cable bundle 310 and other electrical PET components.

Because the PET detectors 30 are well shielded by the combination of screens and screen portions 188, $188_{EC}$, $188_F$, 288, it is contemplated to perform simultaneous PET and magnetic resonance imaging of a brain or other subject disposed inside the end-capped local coil 100. The screens and screen portions 188, $188_{EC}$, $188_F$, 288 are ground planes at the magnetic resonance frequency, and accordingly are configured to not present a substantial barrier to pulsed magnetic field gradient frequencies. The thin galvanic isolation shielding 99 is made of copper or another screening material that does not substantially distort magnetic field gradients generated by the magnetic field gradient assembly 20' away from the vicinity of the PET detector modules 30. The conductors 166 and radio frequency screen 188 are suitably thin strip lines or thin copper foils or conductive meshes like the conductors 66 and radio frequency screen 88 of the whole-body PET/magnetic resonance embodiment, and accordingly do not interfere with acquisition of PET data. The local radio frequency coil 100 is suitably configured, for example, as a quadrature head coil for brain imaging. Multi-element receive-only radio frequency coils may be used in combination with the coil module 100 in the case where a space provision and a detuning functionality of coil module 100 is included. Advantageously, when the local radio frequency coil module 100 with PET detectors 30 is removed from the bore, the magnetic resonance scanner operates as a conventional scanner without any PET detectors being located in the magnetic field region.

The foregoing embodiments have been described with illustrative reference to an imaging system including magnetic resonance and PET capabilities. However, it will be appreciated that other hybrid imaging systems can be similarly constructed and utilized. For example, the generally cylindrical radio frequency screen 88 having radius $R_2$ respective to a central axis CA, and having the central annular groove or channel 98 of smaller radius $R_1$ compared with the radius $R_2$ is also well-suited to accommodate one or more movable radiation detector heads having radiation collimators comprising an electrically non-conductive and non-ferromagnetic heavy atom oxide material such as a lead oxide material. Such a radiation detector head or heads can, for example, define a gamma camera providing single photon emission computed tomography (SPECT) imaging capability or the like. In these embodiments, the coupled electronics perform radiation detection, but the radiation detection does not include coincidence detection. The central annular groove or channel 98 enables the radiation detector heads to be positioned relatively close to the imaging subject while remaining shielded from radio frequency energy generated by magnetic resonance imaging and related processes. Because the central annular groove or channel 98 is annular, it readily accommodates revolution of a radiation detector head around the examination region, even up to a full 360° revolution. The mounting members 32 shown in FIG. 1 passing through the openings in the brace 24 and openings in the cryogenic magnet housing 14 are readily adapted to provide suitably vibration-isolated supports for independent mounting of an annular robotic radiation detector head positioning system capable or revolving radiation detector heads around the examination region and making other adjustments such as tilting or canting the heads. Still further, the electrically non-conductive and non-ferromagnetic heavy atom oxide materials described herein for use in the radiation shielding 60, 62 are readily applied to construction of magnetic resonance-compatible collimators of the type typically used in conjunction with radiation detector heads of gamma cameras. For example, such a collimator can include a resin, glass, or plastic host material in which is dispersed lead oxide in the form of a powder, or can comprise a ceramic material including lead oxide, for example produced by hot curing of lead oxide powder or firing into a glass or crystalline form. Such composites or ceramics are readily shaped or formed to define a collimator with a collimating pinholes array or collimating honeycomb structure.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An imaging system comprising:
   positron emission tomography (PET) detectors substantially encircling an examination region;
   electronics operatively coupled with the PET detectors to perform coincidence detection of probative radiation comprising 511 keV gamma rays generated by electron-positron annihilation events occurring in the examination region;
   a magnetic resonance scanner comprising a main magnet and a magnetic field gradient assembly, the magnetic resonance scanner configured to acquire imaging data from a magnetic resonance examination region at least partially overlapping the examination region surrounded by the PET detectors; and
   a radio frequency coil comprising a plurality of conductors and a radio frequency screen encircling the plurality of conductors, the PET detectors being disposed completely outside of the radio frequency screen, the radio frequency screen providing radio frequency shielding for the PET detectors at the magnetic resonance frequency.

2. The imaging system as set forth in claim 1, comprising:
   radiation shielding disposed adjacent the PET detectors to reduce interaction of non-probative radiation with the PET detectors, at least a portion of the radiation shielding comprising an electrically non-conductive and non-ferromagnetic heavy atom oxide material.

3. The imaging system as set forth in claim 2, wherein the radiation shielding comprises a lead oxide material.

4. The imaging system as set forth in claim 2, wherein the radiation shielding comprises a lead oxide powder material.

5. The imaging system as set forth in claim 2, wherein the radiation shielding comprises a ceramic material including lead oxide.

6. The imaging system as set forth in claim 2, wherein the radiation shielding is selectively extendible toward or away from the examination region.

7. The imaging system as set forth in claim 2, wherein the magnetic resonance scanner is a bore-type scanner, the PET detectors are arranged as an annular ring concentric with a bore of the bore-type scanner, and the radiation shielding comprising an electrically non-conductive and non-ferromagnetic heavy atom oxide material is arranged in two annular shielding rings concentric with the bore and on opposite sides of the annular ring of PET detectors.

8. The imaging system as set forth in claim 7, wherein the magnetic resonance scanner further comprises:
   annular ferromagnetic shims disposed at a same axial position as the annular shielding rings.

9. The imaging system as set forth in claim 1, further comprising:
   electrical power and communication cabling operatively connected with the PET detectors and disposed outside of the radio frequency screen; and
   fluid cooling lines operatively connected with the PET detectors and disposed completely outside of the radio frequency screen.

10. The imaging system as set forth in claim 1, wherein:
    the plurality of conductors of the radio frequency coil are arranged in a line-of-sight between the PET detectors and the examination region, the conductive elements having thickness along the line-of-sight effective to be substantially transparent to the probative radiation.

11. The imaging system as set forth in claim 1, further comprising:
    radiation shielding disposed with the PET detectors and including a heavy metal oxide to reduce interaction of non-probative radiation with the PET detectors.

12. The imaging system as set forth in claim 11, wherein the radiation shielding includes lead oxide dispersed in a resin, glass, or plastic host material.

13. The imaging system as set forth in claim 11, wherein the radiation shielding is selectively extendible toward or away from the examination region.

14. The imaging system as set forth in claim 1, wherein the magnetic resonance scanner is a bore-type scanner, the radio frequency screen comprises a cylindrical radio frequency screen arranged coaxially with a bore of the bore-type scanner, and the PET detectors are arranged as an annular ring concentric with the bore and completely outside of the cylindrical radio frequency screen.

15. The imaging system as set forth in claim 14, wherein the cylindrical radio frequency screen has an annular groove receiving the annular ring of PET detectors.

16. The imaging system as set forth in claim 1, wherein conductors that lie in a line-of-sight between the PET detectors and the examination region have a thickness along the line-of-sight of less than or about 50 microns.

17. The imaging system as set forth in claim 16, wherein the radio frequency coil further comprises:
    lumped capacitors disposed outside of the line-of-sight between the PET detectors and the examination region.

18. The imaging system as set forth in claim 1, wherein the radio frequency coil and the PET detectors are integrally arranged as a local radio frequency coil module that is selectively insertable into the magnetic resonance examination region.

19. The imaging system as set forth in claim 18, wherein the local radio frequency coil is an end-capped radio frequency coil in which the radio frequency screen has an end cap at a capped end to define a radio frequency mirror.

20. The imaging system as set forth in claim 19, wherein the local radio frequency coil has a flanged end opposite the capped end, the radio frequency screen at the flanged end including an outwardly extending flange.

21. An imaging system comprising:
    a magnetic resonance scanner comprising a main magnet, a magnetic field gradient assembly, and a whole-body radio frequency screen;
    a local radio frequency coil having a radio frequency screen including an end-cap portion and a flanged open portion, the flanged portion sized such that an annular edge of the flange portion is proximate to the whole-body radio frequency screen; and
    an annular ring of positron emission tomography (PET) detectors mounted on the local radio frequency coil completely outside of the radio frequency screen of the local radio frequency coil to view the interior of the local radio frequency coil through the radio frequency screen of the local radio frequency coil.

22. An imaging system comprising:
a bore-type magnetic resonance scanner having a scanner bore containing an examination region and comprising a main magnet, a magnetic field gradient assembly, and a generally cylindrical radio frequency screen arranged coaxially with the scanner bore, the generally cylindrical radio frequency screen having a main cylindrical radio frequency screen portion of radius $R_2$ and a central annular groove formed by a groove radio frequency screen portion at a smaller radius $R_1$ compared with the radius $R_2$ that is connected with the main cylindrical radio frequency screen portion; and
one or more radiation detectors received into the annular groove of the generally cylindrical radio frequency screen and operatively coupled with electronics to perform radiation detection, the one or more radiation detectors including a radiation collimator or radiation shielding comprising an electrically non-conductive and non-ferromagnetic heavy atom oxide material, the one or more radiation detectors being outside of the generally cylindrical radio frequency screen with the groove radio frequency screen portion interposed between the one or more radiation detectors received into the annular groove and the examination region such that probative radiation emitted from the examination region passes through the groove radio frequency screen portion before reaching the one or more radiation detectors.

23. The imaging system as set forth in claim 22, wherein the one or more radiation detectors comprise an annular ring of positron emission tomography (PET) detectors received into the annular groove and including cladding annular rings of radiation shielding comprising an electrically non-conductive and non-ferromagnetic heavy atom oxide material.

24. The imaging system as set forth in claim 22, wherein the one or more radiation detectors are selected from a group consisting of: (i) positron emission tomography (PET) detectors having radiation shielding comprising an electrically non-conductive and non-ferromagnetic heavy atom oxide material and (ii) one or more movable radiation detector heads having radiation collimators comprising an electrically non-conductive and non-ferromagnetic heavy atom oxide material.

25. An apparatus comprising:
an annular ring of positron emission tomography (PET) detectors; and
a generally cylindrical radio frequency screen having a radius respective to a central axis, the generally cylindrical radio frequency screen having a central annular groove at which the generally cylindrical radio frequency screen has a smaller radius compared with the radius;
wherein the annular ring of PET detectors is disposed in the central annular groove of the generally cylindrical radio frequency screen with the annular ring of PET detectors surrounded on three sides by the generally cylindrical radio frequency screen.

* * * * *